United States Patent [19]
Newby et al.

[11] Patent Number: 5,512,341
[45] Date of Patent: Apr. 30, 1996

[54] METAL-POLYMER COMPOSITE INSULATIVE SPACER FOR GLASS MEMBERS AND INSULATIVE WINDOW CONTAINING SAME

[75] Inventors: Charles D. Newby, Bexley; Burch E. Zehner, Pataskala; Howard S. Bennett, Jr., Columbus; Jeffrey R. Brandt, Reynoldsburg, all of Ohio

[73] Assignee: Crane Plastics Company Limited Partnership, Columbus, Ohio

[21] Appl. No.: 138,132

[22] Filed: Nov. 15, 1993

Related U.S. Application Data

[63] Continuation-in-part of Ser. No. 5,730, Jan. 19, 1993, which is a continuation-in-part of Ser. No. 870,018, May 18, 1992.

[51] Int. Cl.[6] ........................................................ B32B 7/12
[52] U.S. Cl. ........................ 428/35.8; 428/34; 428/36.6; 428/36.9; 428/36.91; 428/157; 428/167; 428/192; 428/212; 428/458; 428/463; 52/786.1; 52/786.13

[58] Field of Search .................... 428/34, 35.9, 35.8, 428/36.6, 36.1, 36.7, 167, 36.9, 36.91, 68, 192, 421, 457, 155, 157, 172, 212, 463, 458; 52/788, 790

[56] References Cited

U.S. PATENT DOCUMENTS

| | | | |
|---|---|---|---|
| 4,109,431 | 8/1978 | Mazzoni et al. | 428/34 |
| 4,222,213 | 9/1980 | Kessler | 52/790 |
| 4,658,553 | 4/1987 | Shinagawa | 428/34 |
| 4,831,799 | 5/1989 | Glover et al. | 52/790 |
| 5,079,054 | 1/1992 | Davies | 428/34 |

*Primary Examiner*—Donald J. Loney
*Attorney, Agent, or Firm*—Standley & Gilcrest

[57] ABSTRACT

The present invention relates to an insulative spacer member for use between glass members, such as between panes of glass in a multiple glazed window. The present invention also relates to a multiple glazed window having at least one pair of adjacent glass panes separated by an insulative spacer in accordance with the present invention.

32 Claims, 6 Drawing Sheets

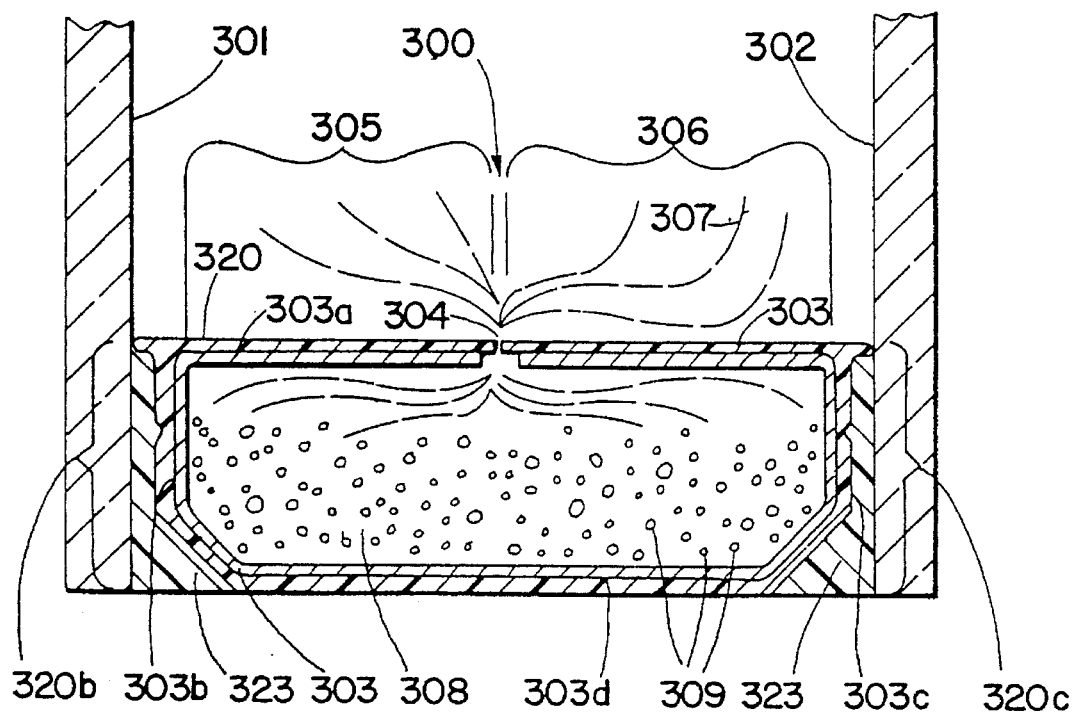
Fig. 12
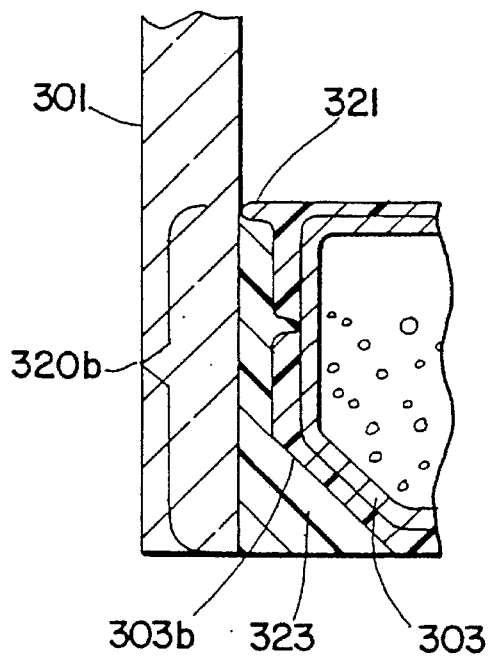 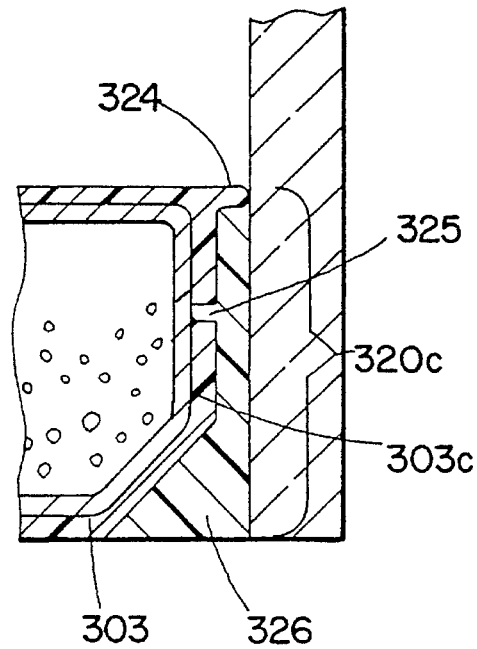
Fig. 13  Fig. 14

METAL-POLYMER COMPOSITE INSULATIVE SPACER FOR GLASS MEMBERS AND INSULATIVE WINDOW CONTAINING SAME

This is a continuation-in-part application of U.S. patent application Ser. No. 08/005,730 filed in the United States Patent and Trademark Office on Jan. 19, 1993 entitled METAL-POLYMER COMPOSITE INSULATIVE SPACER FOR GLASS MEMBERS AND INSULATIVE WINDOW CONTAINING SAME by Charles D. Newby which is a continuation-in-part application to U.S. patent application Ser. No. 07/870,018 filed in the United States Patent and Trademark Office on May 18, 1992 entitled METAL-POLYMER COMPOSITE INSULATIVE SPACER FOR GLASS MEMBERS AND INSULATIVE WINDOWS CONTAINING SAME by Charles D. Newby.

TECHNICAL FIELD

The present invention relates to an insulative spacer member for use between glass members, such as between panes of glass in a multiple glazed window. The present invention also relates to a multiple glazed window having at least one pair of adjacent glass panes separated by an insulative spacer in accordance with the present invention.

BACKGROUND

The present invention relates to the field of glass spacers, such as those applied in the area of prefabricated insulative multiple glazed windows and the like.

A critical requirement in modern building construction is energy conservation. A particular problem in view of the extensive use of glass in modern architecture is a loss of heat from the building through glass surfaces. One solution has been the increased use of insulating glass units, normally comprising at least two glass panes separated by a sealed dry air space. Sealed insulating glass units usually require some means precisely separating the two glass panels.

This leads to the conduction of heat from the interior glass plate to the exterior glass plate from where it is dissipated into the exterior environment. Further, there can result a differential dimensional change between the glass and the spacer, causing stress to develop on the glass and/or the seal which can result in damage to and the failure of the sealed glass unit.

There are several problems to be overcome in producing insulative multiple glazed windows wherein the panes are separated to form an insulative air space.

To provide the best insulative characteristics, the pane edges must be completely sealed to prevent communication between the air trapped between the glass panes, and the air in the environments on either side of the window (and/or in neighboring trapped air spaces in the case of windows having more than two glass panes). This has been traditionally done using a sealant material, such as a curable sealant adhesive, along the outside edges of the glass panes.

In order to best be able to produce a prefabricated multiglazed window, it is necessary that the spacer be of substantially uniform thickness to maintain neighboring glass panes at correspondingly uniform distance from one another. This assures consistent sizing so that the balance of the window assembly can be predictably attached for installation.

Although the window spacer must restrict air flow, it must also prevent moisture from entering the trapped air space. If allowed in, moisture can condense inside the trapped air space, adversely affecting the translucence and appearance of the window. One common method of mitigating the effects of moisture has been to provide the spacer member with a desiccant material, such as silica gel, usually by placing the desiccant within a hollow spacer member, and providing small holes in the inside face of the spacer member to allow the desiccant to communicate with the trapped air space. While such an arrangement can reduce the effect of moisture in the trapped air space, the desiccants and the required machining of the spacer increase the cost of producing the window. Also, the amount of such desiccants in each window is limited by space constraints, and the desiccant cannot be regenerated in situ. Accordingly, desiccants have a limited capacity, and generally are normally exhausted after a few years of normal use, depending upon the ambient conditions.

One of the most serious and challenging problems in the production of window spacers is lack of insulative character in the spacer member itself. Typical spacers comprise hollow metal channels. Although they exclude moisture well, metals have high heat conductivity giving rise to the problem of low insulative character described above. In recent years, the insulative quality of window glass has increased to such an extent that the spacer member increasingly represents the weakest (i.e. most heat transmissive) portion of a multi-glazed window. The industry now recognizes that the spacer now accounts for a substantial portion of the total heat loss through an assembled multi-glazed window.

Metal spacers generally have expansion coefficients which differ from the glass and the sealant material. Also, because the metal/glass interface is difficult to seal, moisture can enter the trapped air space through this avenue.

There have been some attempts to use spacers made of polyvinylchloride rather than metal. This has, however been unsuccessful because the sealants which have been developed to construct reliable units bond well to glass and metal spacers, but not to polyvinylchloride spacers. This leads to structural weaknesses in units constructed with PVC spacers. Furthermore, the differential dimensional change that occurs between glass and PVC spacers over a certain range of temperature is much higher than with a metal spacer. In addition, most plastics have been found unacceptable for use between glass panes because they give off volatile materials, e.g. plasticizers, which can cloud or fog the interior glass surface.

The prior art shows some examples of the use of plastic over core material, but the details of construction and environment differ from the present invention. For example, U.S. Pat. No. 3,694,965 shows a wooden mullion element covered with a plastic extrusion, but this is not a spacer for double insulated glass. U.S. Pat. No. 3,070,854 shows a plastic channel member provided to cover a wooden separator between a pair of glass panes and U.S. Pat. No. 2,239,517 shows a metal separator provided with a plastic coating used in window construction.

U.S. Pat. No. 3,918,231 shows an extruded plastic element for fitting over a metallic frame element. U.S. Pat. No. 3,261,139 discloses a multiple glazed unit having a pair of resilient tape elements keyed to groves in the separator. U.S. Pat. No. 3,012,642 relates to window structures using very complex pane-holding elements. Canadian Patent No. 953,159 shows a double plated panel with a tubular spacer held in place by a non-hardening flow adhesive. German Offenlegungsschrift No. 1 434 283 also shows a spacer for double insulated glass.

U.S. Pat. No. 4,222,213 discloses an insulating spacer comprising an extruded or rolled-formed spacer together with a metal spacer together with a plastic insulating element which thermally insulates the metal spacer from the panes of glass while permitting conventional application of a sealant to provide reliable bonding. In one embodiment, the plastic insulator comprises an extruded plastic overlay which fits tightly over part of a conventional metal spacer. This patent discloses the incorporation of a metal spacer having portions for contacting in the sealant to provide a solid bond between the glass plate and the metal spacer. The spacer also incorporates a plastic insulator element to prevent any direct glass-to-metal spacer contact allowing only minimum contact with the glass plate to reduce heat conduction between the plates, while functioning as a spacer to keep the two glass plates at a measured distance during construction of a sealed window unit. However, the spacer taught by this patent is held mechanically affixed by contact pressure and/or friction. This patent teaches that this friction should not be so great that longitudinal shrinkage and expansion cannot occur with change in temperature due to different coefficients of expansion of the metal and plastic. This patent also teaches that some type of adhesive, such as EVA adhesive, could be used to insure permanent contact between the polymer and metal elements. However, this alternative is not preferred since it introduces the possibility of glass fogging, even when only small quantities of adhesive are used.

The '233 patent also teaches that many common extrudable plastics, such as PVC are not suitable for application in the disclosed spacer because they cause fogging of the glass.

Most recently, U.S. Pat. No. 5,088,258 disclosed an insulating spacer assembly comprising an extruded or rolled-formed hollow metal spacer together with thermal breaks and primary sealant. The spacer and thermal brakes may be coextruded together. However, this patent fails to teach the formation of a metal-polymer composite through the use of a heat-activated adhesive, as is done in the present invention.

U.S. Pat. Nos. 4,222,213 and 5,088,258 are hereby incorporated herein by reference.

The present invention represents an improvement over the prior art in that it allows for the use of a metal-polymer composite as a glass spacer while eliminating both concerns over differential expansion between the metal component and the polymer component, and the potential for fogging of the glass brought about by volatiles where adhesives are used.

The present invention also eliminates a concern over the use of extrudable polymers which normally would be unsuitable because they can give off volatiles, such as plasticizers.

The present invention therefore provides a glass spacer having precise and predictable dimensional characteristics, and excellent thermal insulative qualities. The present invention also eliminates concerns over fogging caused by volatiles in the polymer or the adhesive used to bond the polymer to the metal spacer substrate. The glass spacer of the present invention also provides an excellent barrier against air and moisture to prevent fogging or accelerated degradation of the spacer seal.

It is also desirable to be able to make window spacers efficiently and through the use of minimal processing steps. Some spacers are formed from roll-formed metal substrates to form a hollow metal substrate which then must be spot welded along the seam slit in an additional operation, to make them resist torsional stress along their longitudinal axes to be amenable for use in a window spacer. Beyond involving a separate operation, spot welding also partially closes the seam slit which restricts the air flow between the enclosed inter-glass space and the inner space of the spacer which can be provided with a desiccant.

Accordingly, it is also desirable to produce a spacer that improves the usefulness of desiccant.

Another way in which a fluid communication passage is provided to the desiccant in the interior of the metal substrate is by spot welding holes directly into the solid inner side of a metal substrate itself. However, it would be desirable to provide perforation to the solid inner side of a window spacer which can be done with less expensive and less energy consuming tooling, without damaging such tooling. It is also advantageous to be able to make such a window spacer in an efficient fashion, using few processing steps. One of the areas where the art has struggle to make improvements in the spacer-glass interface. Typical metal-polymer composite window spacers must be installed in the finished multi-glazed insulated glass (IG) window through the use of filler materials such as silicone rubber or poly-isobutylene rubber (PIB rubber), or equivalent materials. One of the ongoing challenges in making an effective spacer-glass interface is to produce a spacer which provides a effective seal between the spacer and the glass; a seal which is both effective in terms of providing insulation between the adjacent glass members, and providing a air seal to prevent moisture-bearing air from entering the inter glass space. One of the complicating factors in improving spacer-glass interfaces is that the polymer materials typically used in metal-polymer spacers (e.g. PVC or CPVC), while having good insulation qualities, have less than ideal moisture barrier qualities, which can allow moisture to enter the inter-glass space over time. In contrast, the filler materials typically used, while having good moisture barrier qualities, lack the insulative qualities to best prevent the transmission of heat through the finished IG window.

Accordingly, it is desirable to be able to produce a window spacer whose design takes best advantage of the beneficial qualities while reducing or eliminating the adverse effects of both its component materials and the filler materials. It is also an object of the present invention to produce a spacer design, and an IG window unit containing same, which can be produced efficiently in few processing steps.

SUMMARY OF THE INVENTION

The present invention includes an insulative spacer for use in between two glass members, and an insulative multi-glazed window containing such an insulative spacer between at least two of its glass panes.

In broadest terms, the insulative spacer of the present invention comprises a metal-polymer composite adapted to fit between two glass members, such as along the edge of two adjacent glass panes.

The metal substrate portion of the composite may be formed in accordance with know methods of producing conventional metal spacers, such as by extrusion. The metal substrate is normally of aluminum, but may be made of any other equivalent metal or alloy commonly used in the art, such as electrogalvanized steel, stainless steel, and the like. The metal substrate is normally extruded into a hollow rod shaped so as to fit between the glass members, such as along the edge of two glass panes. A commonly preferred embodiment is to provide the hollow rod with a quantity of a desiccant material, with the spacer ventilated into the sealed air space to allow the desiccant to absorb moisture from the sealed space.

The metal-polymer composite is formed by extruding a polymer coating over the metal substrate in the presence of a heat-activated adhesive which bonds the polymer to the metal substrate during the extrusion process. It is preferred that the coating polymer cover substantially the entire inner surface of the metal substrate, i.e. that surface facing into the sealed air space. Such an arrangement helps to seal the inter-glass space from any residual volatiles in the heat-activated adhesive. Most preferably, the coating polymer covers the entire outer surface of the metal substrate. The extruded polymer coating is shaped so as to present an appropriate architecture to fit snugly between the glass members, as shown for instance in the accompanying Figures.

Suitable polymers may include any extrudable polymer including polyvinylchloride, chloropolyvinylchlorides and other polymers which may be amendable to compositing extrusion with an appropriate heat-activated adhesive. A specific example of such a suitable polymer is a low- or non-plasticized PVC, such as rigid PVC No. 85857, commercially available from B. F. Goodrich Company of Akron, Ohio. Although not a limitation to the present invention, typical coating polymer thicknesses may be in the range of from 1 to 40 mils, typically 20 mils. The polymer may be provided with a pigment suitable to use in the selected polymer, as is known in the art.

Another alternative is to have the polymer be a fluoropolymer. Fluoropolymers have the advantage that they are relatively better able to act as a moisture barrier, reducing the likelihood that moisture will enter the sealed space between the glass panes. Also, fluoropolymers have excellent weatherability and thus will be less likely to deteriorate over long time exposure to sunlight, moisture, acids and other environmental factors.

The heat-activated adhesive may be selected from any adhesives appropriate to bind the desired metal-polymer combination to form a composite. Examples include heat-activated adhesives of the class commonly referred to as plastisol primers, such as those commercially available for instance from B. F. Goodrich Company of Akron, Ohio. For instance, where the metal substrate is aluminum a polymer extrudate coating is polyvinylchloride, an appropriate heat-activated adhesive may be plastisol primer A 1104-B or A 1167-B commercially available from B. F. Goodrich Company of Akron, Ohio, or plastisol primer AX51250, commercially available from Ashland Chemical Company of Columbus, Ohio. The heat-activated adhesive may be applied to the metal substrate either during the coextrusion process; or the metal substrate may be prepared with a layer of the adhesive prior use in the coextrusion process. A typical dry thickness for the heat-activated adhesive is in the range of 0.2 to 0.4 mil, though not a limitation to the practice of the invention.

The metal-polymer composite is shaped so as to present at least three surfaces: an inner surface adapted to face toward the inside of the sealed air space in the multi-glazed window, and two engagement surfaces adapted respectively to engage the two glass member inner surfaces. Preferably, the polymer also coats the fourth surface, i.e. the surface facing outwardly from between the inner surface of the two glass members. In an alternative embodiment, the polymer may be made to coat only the two engagement surfaces. Examples of such alternatives are shown in the accompanying figures.

In a preferred embodiment, the inner surface may be coated with a layer of at least one fluoropolymer. This layer may be coextruded with the compositing polymer layer in accordance with commonly used methods, such as by using a side extruder. The fluoropolymer may also contain a pigment chosen from any of those commonly available and appropriate for use in fluoropolymers.

The present invention also includes a multi-glazed window assembly wherein at least one adjacent pair of glass panes is provided with an insulative spacer according to the present invention.

By forming a metal-polymer composite in this way, one of the advantages of the tight bond between the polymer and the metal allows the metal to overcome the difference in linear expansion coefficients so that the metal polymer composites exhibits expansion behavior similar to that of the metal substrate alone; i.e. as a single material.

The metal-polymer composites of the present invention may be formed by coextrusion of the coating polymer over the metal substrate in accordance with commonly accepted coextrusion practices. For instance, the coating polymer may be coextruded over an aluminum substrate at a temperature in the range of about 300° F. to about 400° F. This may be done using commercially available extrusion equipment such as common single- or multiple-screw extruders such as those commercially available from Cincinnati Milacron. The optional layer of fluoropolymer may also be coextruded as part of the metal-polymer composite using a side extruder, for instance.

In a preferred embodiment, the coating polymer may be foamed to provide small gas spaces within the coating polymer layer. This not only increases the insulative value of the coating polymer layer, but reduces the volume of coating polymer per linear foot of the coextrudate. The coating polymer may be foamed using either azo-type or bicarbonate foaming agents, azo-type agents being preferred. The foaming agents are admixed with the coating polymer in the extruder in accordance with known practice. Examples of appropriate azo-type agents include Siligen®, Grade AZRV, commercially available from Uniroyal Chemical Company of Middlebury, Conn., and Grade No. HRVP01 from Hughes Industrial Corporation. The azo-type foaming agents are used in a concentration range of from about 0.1 to about 1.0 parts per hundred (pph), preferably in the range of about 0.3 to 0.5 pph, with 0.3 pph being the most preferred value. An example of the bicarbonate type foaming agents include Hydrocerol®, commercially available from Boehringer Ingelheim, which is used in a concentration range on the order of those given above for the azo-type foaming agents.

The thickness of the foamed polymers are typically in the range of from about 10 to about 30 mil, preferably about 25 mil.

As an example, the Hughes Industrial Corporation Grade No. HRVP01 was used with a high impact, weatherable PVC, B. F. Goodrich 85857, at a concentration of about 0.3 pph. A Davis Standard 1.25 inch single screw extruder produced the extrudate at a rate of 6.5 ft/min using a barrel temperature of 345° F.

The present invention also includes a multi-glazed window assembly wherein at least one adjacent pair of glass panes are provided with an insulative spacer in accordance with the present invention. Such a window may be assembled in accordance with methods and materials known in the prefabricated window art, as exemplified in the accompanying figures. Due to the nature of the finished metal-polymer spacer, it is preferred that the spacer extrudate be installed by cutting it to size and jointing it at intersections rather than by attempting to bend the spacer of the present invention. The spacer extrudate may be installed by cutting it to size and jointing it at intersections or by bending the spacer of the present invention to fit the desired window perimeter.

Others aspect of the present invention include novel spacer designs for use in accordance with the present invention, methods of making same, and a multi-glazed window containing such spacers.

The first such spacer design is a spacer member for use between two glass members and, in broadest terms, comprises: (a) a metal-polymer composite comprising: a roll-formed metal substrate, said metal substrate formed so as to have a longitudinal axis, an inner surface (i.e that surface adapted to face the inter-glass space), two engagement surfaces (i.e. those surfaces respectively facing each of the interior sides of the adjacent glass members separated by the spacer), and an outer surface (i.e. that side facing away from the inter-glass space). The sides of the metal substrate substantially enclose a space, and the inner surface of said metal substrate has an open slit extending substantially parallel to said longitudinal axis and substantially the entire length of said metal substrate. This slit is typically formed as a seam in a roll-forming process (which is preferred), but may be formed through other equivalent means.

A polymer is attached to said metal substrate so as to form said metal-polymer composite. The polymer is typically adhered to at least the engagement surfaces and the inner surface of the metal substrate by coextrusion, although there are other equivalent ways to attach the polymeric portions, such as by attachment in a secondary operation. The rigidity of the polymer portion is such that the metal-polymer composite substantially resists torsional force about said longitudinal axis. The advantage of this construction is that the seam need not be welded (such as by laser welding) to render the metal substrate substantially resistant to torsional forces. Rather, the spacer of the present invention uses the rigidity of the polymeric portion in combination to that contributed by the metal substrate to produce a workable spacer.

The polymer may be disposed only on the engagement surfaces and on the inner surface of the metal substrate (which can be sufficient to render the metal-composite spacer sufficiently workably rigid), and/or on the outer surface. The portion of the polymer over the slit may be perforated, to maintain an air pathway through the inner surface so as to allow air into the interior space of the spacer, where the use of a desiccant (which is preferred) is desired.

The present invention also includes a method of producing such a spacer, the method comprising the steps of: (a) roll forming a strip of metal so as to form the metal substrate having a longitudinal axis, an inner surface, two engagement surfaces and an outer surface, the surfaces substantially enclosing a space, and the inner surface of the metal substrate having an open slit extending substantially parallel to the longitudinal axis and substantially the entire length of the metal substrate; and (b) attaching a polymer to at least the engagement surfaces and the inner surface of the metal substrate so as to form the metal-polymer composite; whereby the metal substrate substantially resists torsional force about the longitudinal axis.

It is preferred that the method is carried out by roll-forming the strip of metal followed by extruding the polymer onto the metal substrate. It is also preferred that the portion of the polymer disposed over the slit be perforated so as to allow air to enter the interior of the spacer when the use of a desiccant is desired.

One of the benefits of this method and the spacer made thereby is that the need for spot welding is obviated and the resulting spacer is improved with respect to its ability to provide fluid communication to a desiccant contained in the inner space of the metal substrate.

In an alternative embodiment, the slit may be left uncovered by providing an appropriately shaped die, in which case it is required that the slit be laser welded. While not having the advantage of avoiding the use of laser welding, this embodiment does allow one to avoid the step of perforating the inner surface of the finished spacer. It is preferred that the polymer is disposed on all of said surfaces of the metal substrate.

The metal substrate may be made of any appropriate metals such aluminum, stainless steel and electrogalvanized steel, or equivalent materials.

The polymer is typically selected from the group consisting of polyvinylchlorides and chloropolyvinylchlorides, but may be of any equivalent polymer appropriate to use in a metal-polymer composite spacer. The preferred polymer is the PVC types disclosed herein, and may be adhered to the metal substrate by a heat-activated adhesive, such as a plastisol primer, or equivalent material.

In addition, it is also preferred that the metal-polymer composite additionally includes a layer of a fluoropolymer disposed on said polymer, covering at least the inner surface of the metal-polymer composite.

The spacer member may also have its inner space provided with a desiccant.

The present invention also includes a method of producing such a spacer, the method comprising the steps of: (a) roll forming a strip of metal so as to form the metal substrate having a longitudinal axis, an inner surface, two engagement surfaces and an outer surface, the surfaces substantially enclosing a space, and the inner surface of the metal substrate having a slit extending substantially parallel to the longitudinal axis and substantially the entire length of the metal substrate; and (b) welding the slit at a plurality of locations whereby the metal substrate substantially resists torsional force about the longitudinal axis; and (c) attaching a polymer to at least the engagement surfaces and the inner surface of the metal substrate so as to form the metal-polymer composite; except that said slit is maintained substantially open so as to allow air into said space.

The present invention also includes a multi-glazed window comprising at least two adjacent glass panes, at least one adjacent pair of the glass panes having such a spacer member disposed between the glass panes.

The present invention also includes a spacer member for use between two glass members, which comprises a metal-polymer composite, the composite comprising: (a) a metal substrate having a longitudinal axis, an inner surface, two engagement surfaces and an outer surface, these surfaces substantially enclosing a space; the inner surface of the metal substrate comprising two opposed portions having a slit therebetween, with the slit extending substantially parallel to the longitudinal axis; the opposed portions each having terminal edges bent into the space so as to form a trough in the inner surface and substantially parallel to the longitudinal axis; (b) a polymer attached to at least the inner side of the metal substrate so as to form the metal-polymer composite, the polymer disposed over the trough; and (c) at least one aperture in the polymer allowing fluid communication into the space.

The materials used and preferred for the metal substrate, the polymer, and the heat-activated adhesive used to adhere the polymer to the metal substrate are as given above.

It is preferred that the at least one aperture comprise a series of apertures disposed in a linear series substantially parallel to the longitudinal axis.

It is likewise preferred that the metal-polymer composite additionally comprise a layer of a fluoropolymer disposed on the polymer and at least on the portion of the polymer overlying the inner surface.

The inner space of this spacer may likewise be provided with a desiccant, such as any of those known and used in the art.

The present invention also includes a multi-glazed window comprising at least two adjacent glass panes, at least one adjacent pair of the glass panes having such a spacer member disposed between the glass panes.

The present invention also includes a method of producing such a spacer, the method comprising the steps of: (a) roll forming a strip of metal so as to form a metal substrate having a longitudinal axis, an inner surface, two engagement surfaces, an outer surface, the surfaces substantially enclosing a space, the inner surface of the metal substrate having a slit extending substantially parallel to the longitudinal axis and substantially the entire length of the metal substrate, and the inner surface of said metal substrate comprising two opposed portions having the slit between them, with the opposed portions each having terminal edges, the terminal edges being bent into the space so as to form a trough substantially parallel to the longitudinal axis; (b) attaching a polymer to the metal substrate to at least the inner side of the metal substrate so as to form a metal-polymer composite, the polymer disposed over the trough; and (c) perforating the portion of the polymer disposed over the trough so as to allowing fluid communication into the space.

It is preferred that the method be carried out by rollforming the strip of metal followed by extruding the polymer onto the metal substrate, followed by perforating the polymer disposed over the trough.

The present invention also includes a spacer member for use between two glass members, which comprises a metal-polymer composite, the composite comprising: (a) a metal substrate having a longitudinal axis, and two engagement surfaces, (b) a polymer portion adhered to each of the engagement sides of the metal substrate, each polymer portion having at least one extension portion adapted to contact one of said glass members, and at least one trough, the trough extending substantially to the respective engagement surface.

The materials used and preferred for the metal substrate, the polymer, and the heat-activated adhesive used to adhere the polymer to the metal substrate are as given above.

It is preferred that the trough(s) extend(s) nearly completely to the respective engagement surface.

The present invention also includes a multi-glazed window comprising at least two adjacent glass panes, at least one adjacent pair of the glass panes having such a spacer member disposed between the glass panes.

The spacer according to this embodiment of the present invention can be made using standard coextrusion techniques by using appropriately sized and toleranced dies in accordance with practices known in the art.

It will be understood from the foregoing disclosure that permutations incorporating one or more of the features of one embodiment of the present invention can be readily combined with one or more features of other embodiments of the present invention, in light of the guidance gained from the present disclosure,

DESCRIPTION OF THE DRAWINGS

FIG. 12 is a cross-sectional view of a spacer member in accordance with another embodiment of the present invention, shown interposed between two glass panes.

FIG. 13 shows a portion of the cross-sectional view of a spacer member shown in FIG. 12.

FIG. 14 shows a portion of the cross-sectional view of a spacer member shown in FIG. 12.

DETAILED DESCRIPTION OF THE PREFERRED EMBODIMENTS

The following presents a preferred embodiment of the present invention which is presently considered to be the best mode contemplated for use as an insulative window pane spacer and an insulative window containing such a spacer.

Figure 1:
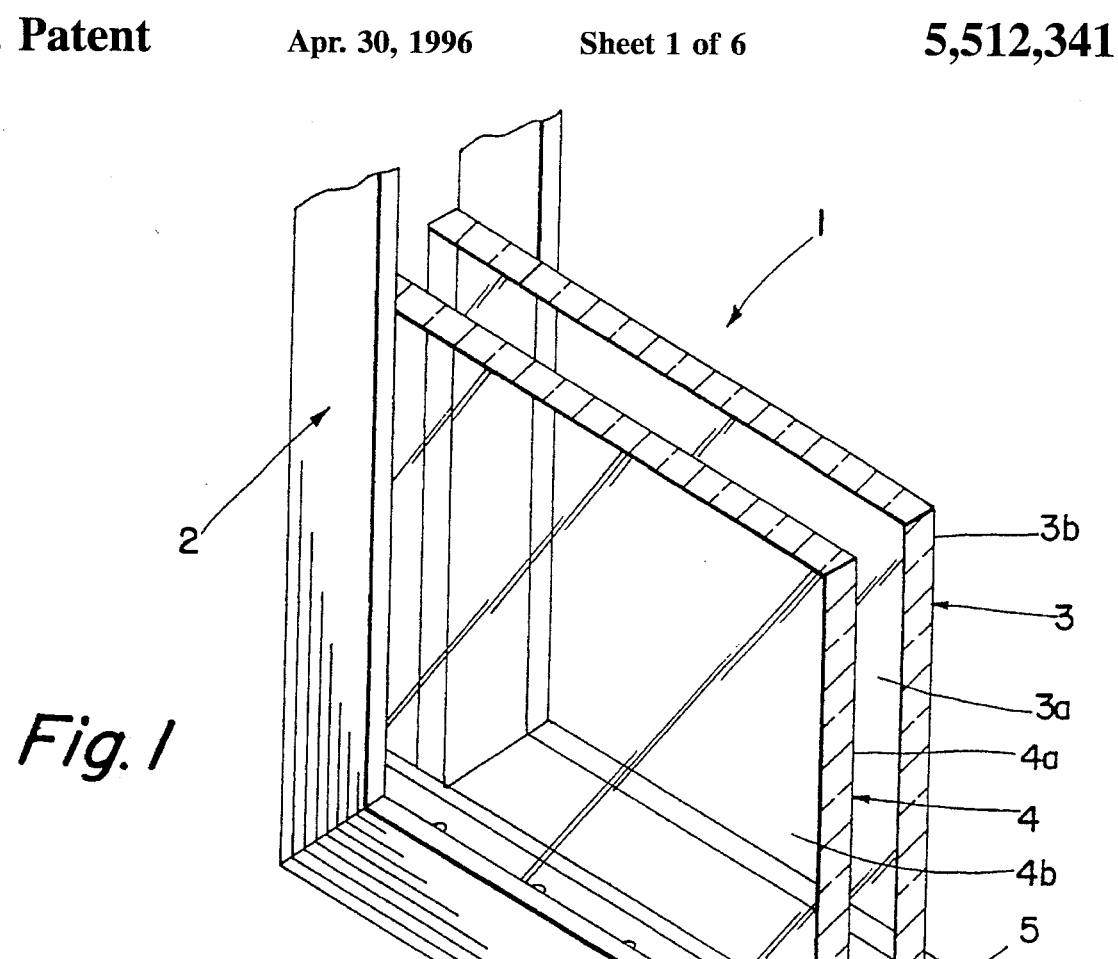
FIG. 1 is a prospective view of a sectioned dual pane window containing an insulative spacer in accordance with one embodiment of the present invention.

Turning to the Figures, FIG. 1 shows insulative window 1 which is constructed from window frame 2 and glass panes 3 and 4. Glass pane 3 has inner surface 3a and outer surface 3b. Glass pane 4 has inner surface 4a and outer surface 4b together with the insulative spacer member 6. Glass panes 3 and 4 enclosed seal air space 5. Insulative spacer member 6 is a metal-polymer composite comprising metal substrate member 7 and polymer coating 8. The insulative spacer member presents outer surface 9 (facing away from sealed airspace 5), inner surface 10 (facing toward sealed inner space 5), and engagement surfaces 11 and 12 which respectively sealingly engage inner surfaces 3a and 4a.

Figure 2:
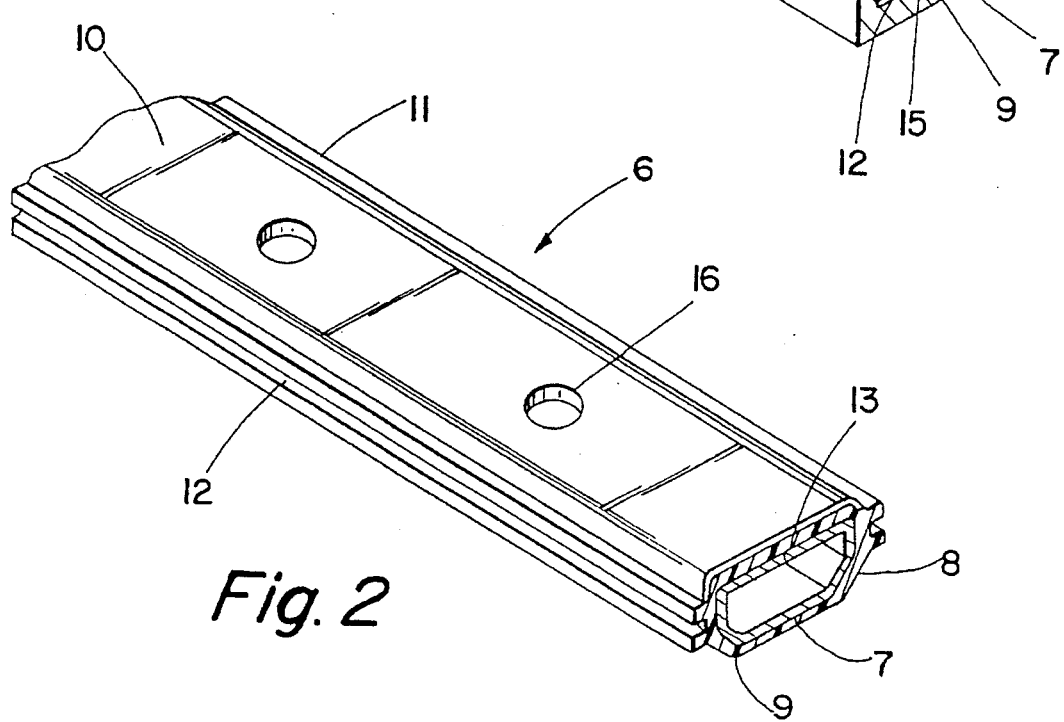
FIG. 2 is a section prospective view of an insulative spacer in accordance with one embodiment of the present invention.

FIG. 2 is a sectioned prospective view of a length of an insulative spacer member 6. This view shows metal substrate 7 and polymer coating 8, between which resides a thin adhesive inner face formed by the heat-activated adhesive. FIG. 2 shows outer surface 9, inner surface 10 and engagement surfaces 11 and 12. Also shown in FIG. 2 is the optional fluoropolymer layer disposed on inner surface 10.

Figure 3:
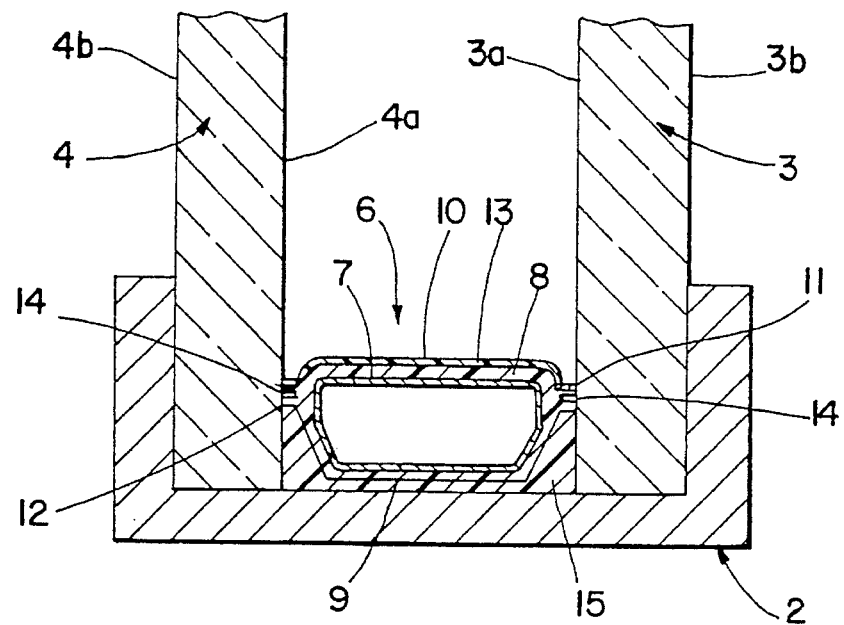
FIG. 3 is a cross section view of an insulative spacer in accordance with one embodiment of the present invention.

Turning to FIG. 3, insulative spacer member 6 is shown in cross section as it would appear disposed between glass pane 3 (having inner surface 3a and outer surface 3b) and glass pane 4 (having inner surface 4a and outer surface 4b). FIG. 3 also shows the metal substrate portion 7 and the polymer coating 8 which is formed into a metal-polymer composite by a heat-activated adhesive at the inter face between the two. Insulative spacer member 6 is shown having outer surface 9 which may be sealed with a layer of a conventional sealant 15 (such as a silicone sealant). Inner surface 10 of insulative spacer member 6 is also shown on having disposed thereupon optional fluoropolymer layer 13. The finished inner surface may be provided with small apertures 16 to allow the sealed air space to allow the space to communicate with the hollow center of the spacer where it is provided with a desiccant. Engagement surfaces 11 and 12 are shown as having a conventional two-prong cross sectional shape so as to engage inner surfaces 3a and 4a, respectively. Between the two prongs is disposed a moisture barrier material 14 (such as a polyisobutylene material) which supplements the air barrier characteristics of the sealant 15.

FIGS. 4 through 7 show alternative embodiments of the present invention, although the best mode of the present invention is currently thought to be that shown in FIGS. 1 through 3.

Figure 4:
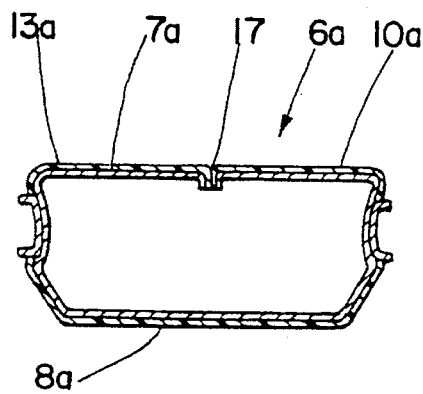
FIGS. 4–7 are cross-section views of other insulative spacers in accordance with other embodiments of the present invention.

Figure 4 shows an alternative architecture of an insulative spacer member 6a. Insulative spacer member 6a is shown as having corresponding metal substrate portion 7a, polymer coating 8a and optional fluoropolymer layer 13a. Also shown in FIG. 4 is an aspect of the spacer architecture that can be applied to any of the embodiments shown in FIGS. 3 through 6. Such feature is a small slot 17 formed along upper surface 10a by the splitting and turning in of the metal substrate 7a and the coating polymer 13a. This alternative architecture also allows for communication between the sealed air space and the hollow interior of the spacer member so that a desiccant may be used in the interior of the spacer member.

Figure 5:
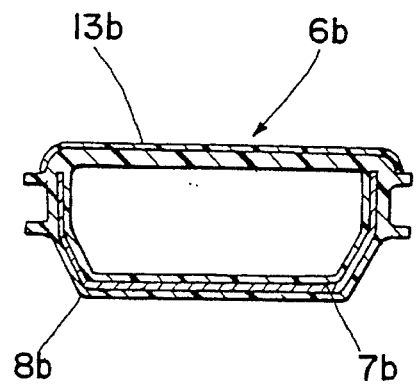

FIG. 5 shows insulative spacer member 6b having an alternative architecture and comprising metal substrate portion 7b, polymer coating 8b and optional fluoropolymer layer 13b.

Figure 6:
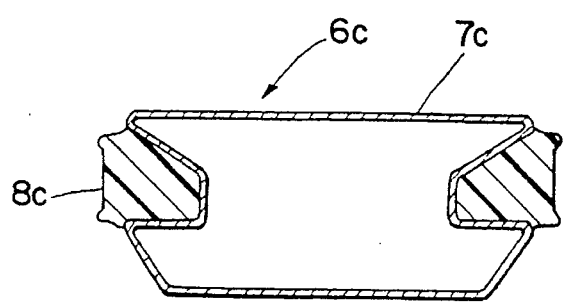

FIG. 6 shows yet another insulative spacer member 6c exemplifying yet another spacer architecture and comprising corresponding metal substrate portion 7c and polymer coating 8c.

Figure 7:
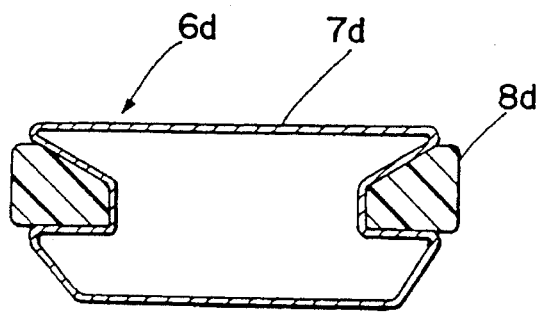

FIG. 7 shows insulative spacer member 6d which shows another spacer architecture, and comprises a corresponding metal substrate portion 7d and polymer coating 8d.

In accordance with the foregoing summary, the preferred embodiments of the additional present inventions are shown in the accompanying FIGS. 8–16.

Figure 8:
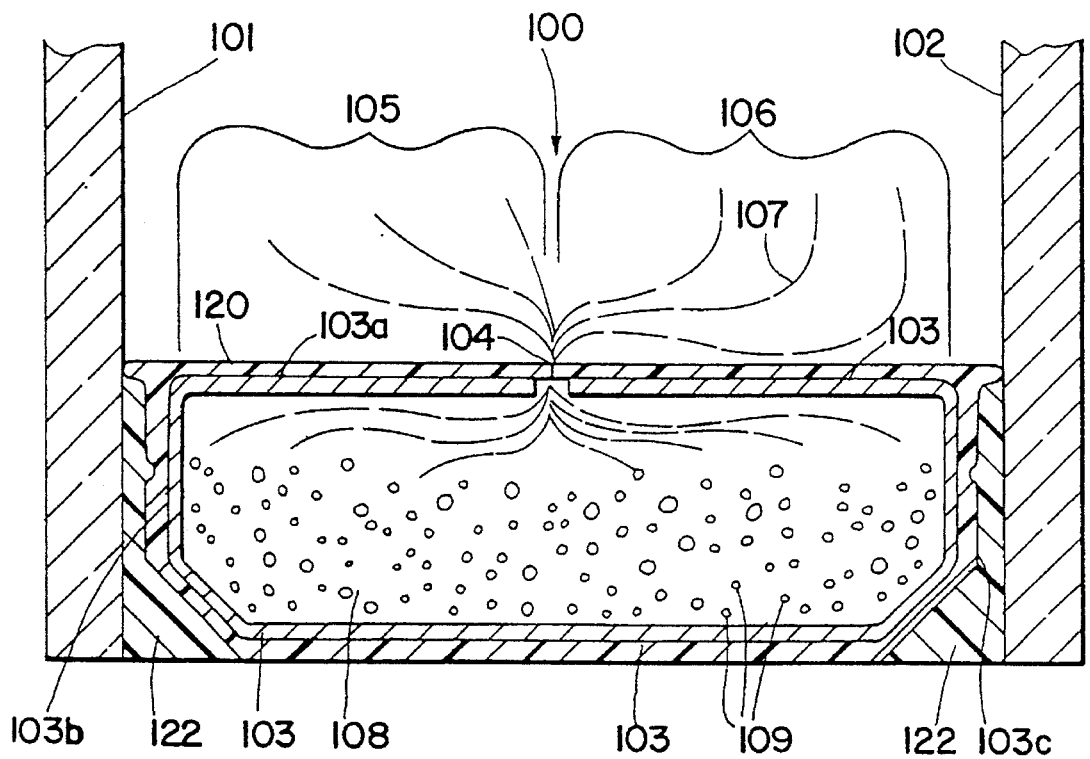
FIG. 8 is a cross-sectional view of a spacer member in accordance with another embodiment of the present invention, shown interposed between two glass panes.

FIG. 8 shows spacer 100 interposed between glass panes 101 and 102, which may be incorporated into a conventional IG window such as is shown in FIG. 1. Window spacer 100 is sealed in place by sealant material 122, such as polyisobutylene (PIB) rubber.

Window spacer 100 comprises a roll-formed metal substrate 103 having inner surface 103a, engagement surfaces 103band 103c, and outer surface 103d. The portion of metal substrate 103 forming inner surface 103a has seam slit 104 which extends longitudinally the length of the metal substrate 103. Slit 104 separates the two portions 105 and 106 of that portion forming inner surface 103a. Roll-formed metal substrate 103 alone in its unaltered state is flexible to torsional stress applied along its longitudinal axis.

Slit 104 is left unwelded and at least the engagement surfaces (103b and 103c) and the inner surface 103a of the metal substrate are provided with a layer of polymer 120. Providing this layer of polymer solidifies the resultant metal-polymer substrate to resist torsional force about its longitudinal axis. It will be found that any appropriate polymer having sufficient rigidity to render the metal-polymer composite sufficiently workably resistant to torsional stress may be used in accordance with the guidance given in the present disclosure.

The spacer of this embodiment can therefore be produced by roll-forming the metal substrate (without spot welding the resulting slit), and coextruding the polymer onto the metal substrate in the fashion described above.

As is shown in FIG. 8, the spaces formed between glass panes 101 and 102 polymeric portion 120 is filled with sealant material 122. The portion of the polymer disposed over the inner surface of the metal substrate may then be perforated so as to allow air into the interior space, where the use of a desiccant is desired.

Figure 9:
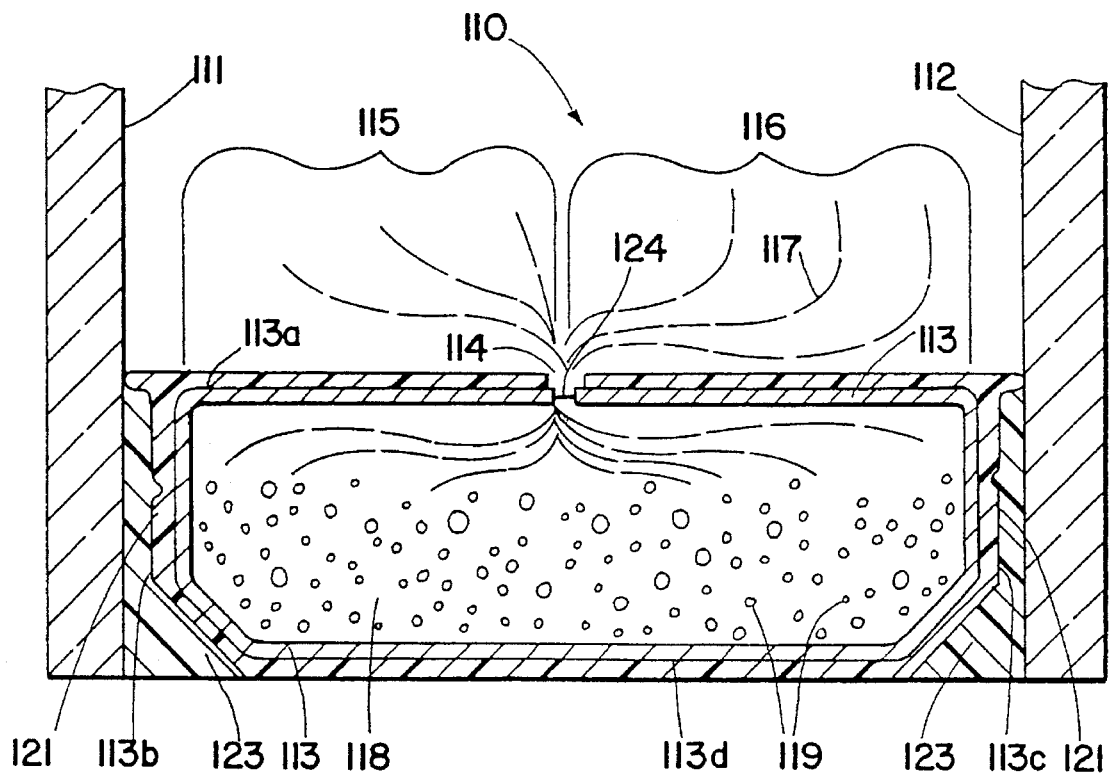
FIG. 9 is a cross-sectional view of a spacer member in accordance with another embodiment of the present invention, shown interposed between two glass panes.

A window spacer in accordance with the present invention can be formed in another way (as shown in FIG. 9). FIG. 9 shows slit 114 which is laser welded at several points (such as 124) along its length to solidify it against torsional stress, and polymer 121 is applied to at least the engagement surfaces and the inner surface of the metal substrate, except that the slit is maintained substantially open by providing a gap in the polymer 121 over slit 114 so as to allow air into the space, where the use of a desiccant is desired. Preferably, polymer is disposed on the outer surface of the metal substrate as well (shown as polymer layer 121 in FIG. 9). Slit 114 provides air circulation (shown by lines 117) to interior space 108 which contains desiccant 109.

FIG. 9 similarly shows spacer 110 interposed between glass panes 111 and 112, which may be incorporated into a conventional IG window such as is shown in FIG. 1.

Window spacer 110 comprises a roll-formed metal substrate 113 having inner surface 113a, engagement surfaces 113b and 113c, and outer surface 113d. The portion of metal substrate 113 forming inner surface 113a has seam slit 114 which extends longitudinally the length of the metal substrate 113. Slit 114 separates the two portions 115 and 116 of that portion forming inner surface 113a. Roll-formed metal substrate 113 alone in its unaltered state is flexible to torsional stress applied along its longitudinal axis.

The thickness of the polymeric coating, although not a limitation to this embodiment of the invention, in broadest terms, is typically in the range of from about 0.007 to about 0.030 inches. Polymers used in accordance with the present invention may be chosen from any polymer appropriate for use in a window spacer, such as rigid and semi-rigid polyvinylchlorides (PVCs) and chloropolyvinylchlorides (CPVCs), such as those mentioned above. These polymers include those mentioned above.

As is shown in FIG. 9, the spaces formed between glass panes 111 and 112 polymeric portion 121 is filled with filler material 123.

Figure 10:
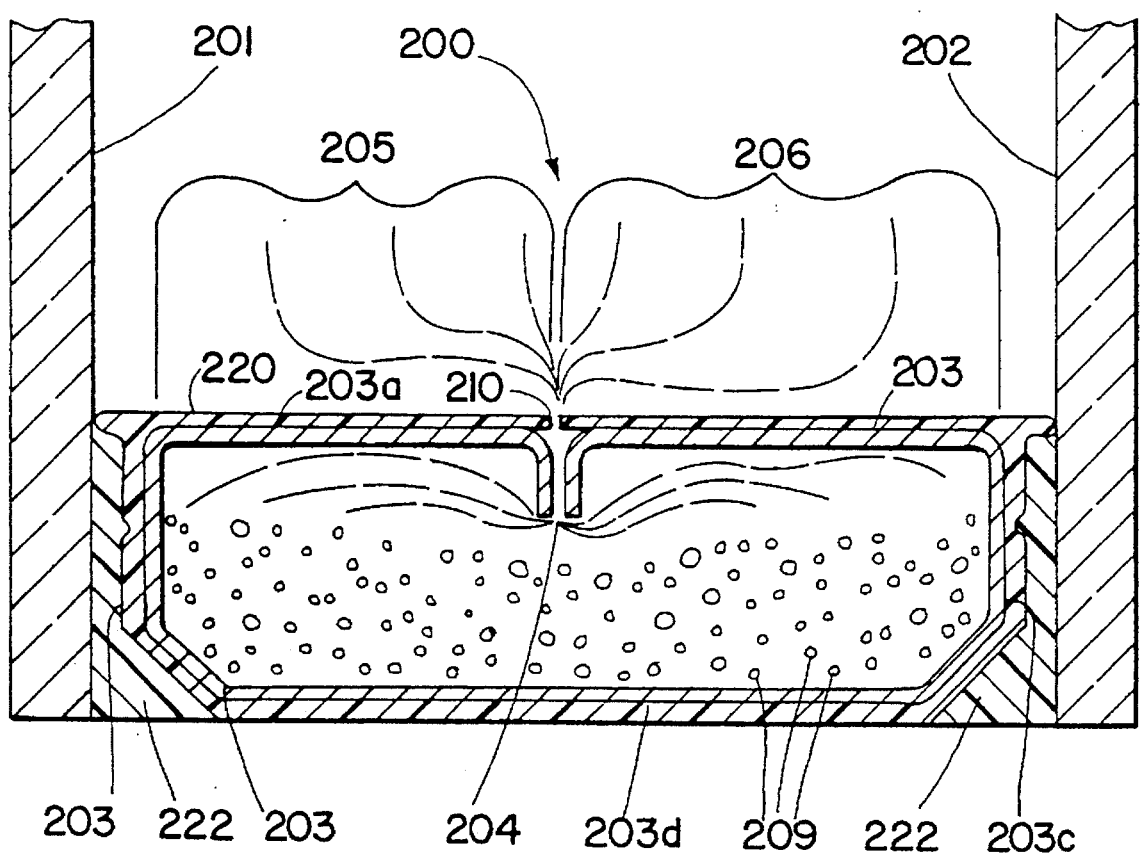
FIG. 10 is a cross-sectional view of a spacer member in accordance with another embodiment of the present invention, shown interposed between two glass panes.

The next embodiment of the present invention is shown in FIG. 10.

FIG. 10 shows spacer 200 interposed between glass panes 201 and 202, which may be incorporated into a conventional IG window such as is shown in FIG. 1. As is shown in FIG. 10, the spaces formed between glass panes 201 and 202 and polymeric portion 220 is filled with sealant material 222, such as polyisobutylene (PIB) rubber.

Window spacer 200 comprises a roll-formed metal substrate 203 having inner surface 203a, engagement surfaces 203b and 203c, and outer surface 203d. The portion of metal substrate 203 forming inner surface 203a has seam slit 204 which extends longitudinally the length of the metal substrate 203. Slit 204 separates the two portions 205 and 206 of that portion forming inner surface 203a. Slit 204 provides air circulation (shown by lines 207) to interior space 208 which contains desiccant 209.

The terminal ends of portions 205 and 206, denoted 205a and 206a, are specifically roll-formed to be deformed inward toward interior space 208 so as to form trough 210.

Figure 11:
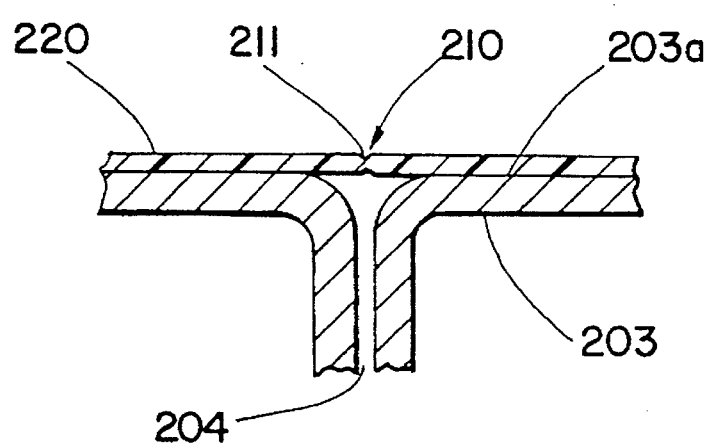
FIG. 11 is a detailed view of a portion of FIG. 10.

Roll-formed metal substrate 203 alone in its unaltered state is flexible to torsional stress applied along its longitudinal axis. In this embodiment, slit 204 could be (but need not be) spot welded along its length to solidify it against torsional stress about its longitudinal axis, or provided with a polymer 220 to cover at least the engagement surfaces of the metal substrate (as is shown in FIG. 8) and to the entire inner surface (including the portion containing trough 210), and preferably on all surfaces of the metal substrate (as shown in FIG. 10; covering surface 203d is optional). Even if slit 204 is not spot welded, the polymer covering serves to solidify the resultant metal-polymer substrate. Providing this layer of polymer covers trough 210 which can further be perforated with standard perforating equipment to provide air circulation to inner space 208 to desiccant 209. The design of this embodiment of the present invention allows the polymer disposed over the trough to be perforated without injury or increased wear to the perforating equipment by providing clearance for the tooling to perforate to polymer without encountering the surface of the metal substrate. FIG. 11 shows a detailed view of spacer 200. This view shows metal substrate 203, inner surface 203a, polymeric layer 220, and slit 204. This view also shows that polymeric layer 220 is perforated above trough 210, such as by hole 211.

The thickness of the polymeric coating, although not a limitation to this embodiment of the invention in broadest terms, is typically in the range of from about 0.007 to about 0.060 inches. Polymers used in accordance with the present invention may be chosen from any polymer appropriate for use in a window spacer, such as rigid and semi-rigid polyvinylchlorides (PVCs) and chloropolyvinylchlorides (CPVCs), such as those mentioned above. These polymers include those mentioned above. Where the metal substrate is spot welded, the rigidity of the polymer is not as critical, but the same polymers can be used.

The spacer of this embodiment can therefore be produced by roll-forming the metal substrate (spot welding the slit where desired), coextruding the polymer onto the metal substrate, followed by perforating that portion of the polymer overlying the trough formed in the metal spacer as described above.

The next embodiment of the present invention is shown in FIG. 12.

FIG. 12 shows spacer 300 interposed between glass panes 301 and 302, which may be incorporated into a conventional IG window such as is shown in FIG. 1.

Window spacer 300 comprises metal substrate 303 (i.e. roll-formed) having inner surface 303a, engagement surfaces 303b and 303c, and outer surface 303d. The portion of metal substrate 303 forming inner surface 303a has seam slit 304 which extends longitudinally the length of the metal substrate 303. Slit 304 provides air circulation (shown by lines 307) to interior space 308 which contains desiccant 309.

The central feature of this embodiment is the architecture of the polymer covering the engagement surfaces. Accordingly, the spacer of this embodiment of the present invention may have at least the two engagement surfaces 303b and 303c provided, respectively, with portions of polymeric coating 320, denoted 320b and 320c; and with additional polymeric coating to surfaces 303a and 303d optional, but preferred.

FIG. 12 shows the architecture of the polymer coating portions 320b and 320c. Portion 320b (shown in more detail in FIG. 13) shows one alternative embodiment of the architecture by being formed so as to have at least one contact portion 321 (usually in the form of an extension) which is adapted to contact the inner surface of glass pane 301. Portion 320b also contains trough portion 322 which extends substantially to the surface 303b. Typically, the trough portion 322 will extend at least 50% of the distance to the respective engagement surface, preferably at least 75% of the distance to the respective engagement surface, and most preferably at least 95% of the distance to the respective engagement surface.

As is shown in FIGS. 12 and 13, the space formed between glass pane 301 and polymeric portion 320b is filled with sealant material 323.

Portion 320c (shown in more detail in FIG. 14) shows another alternative embodiment of the architecture by being formed so as to have at least one contact portion 324 (usually in the form of an extension) which is adapted to contact the inner surface of glass pane 302. Portion 320c also contains trough portion 325 which extends to the surface 303b, dividing portion 320c. As is shown in FIGS. 12 and 14, the space formed between glass pane 302 and polymeric portion 320c is filled with sealant material 326.

Of the two embodiments shown in FIGS. 13 and 14, the architecture of FIG. 13 is preferred because it gives the benefits of an restricted moisture path without having the bare metal at the bottom of the trough in FIG. 14 exposed to the extrusion die, which could cause friction and resultant wear on the die.

The thickness of the polymeric coating, although not a limitation to this embodiment of the invention in broadest terms, is typically in the range of from about 0.007 to about 0.060 inches. Polymers used in accordance with the present invention may be chosen from any polymer appropriate for use in a window spacer, such as rigid and semi-rigid polyvinylchlorides (PVCs) and chloropolyvinylchlorides (CPVCs), such as those mentioned above. These polymers include those mentioned above. Where the metal substrate is spot welded, the rigidity of the polymer is not as critical, but the same polymers can be used.

Accordingly, although not a limitation to this embodiment of the invention in broadest terms, the trough typically extends to a distance of between from about 0 to about 0.030 inches from the metal substrate; i.e. cutting through 50% to 100% of the thickness of the polymer layer.

As is shown in FIG. 12, the space formed between glass pane 302 and polymeric portion 320c is filled with filler material 326. The filler material may be selected from any material typically used in the art, such as polyisobutylene (PIB) and silicone rubber.

Either of the architectures of this embodiment of the present invention, and their many variations, can be made using known coextrusion techniques to coextrude a polymer onto a metal substrate, such as those disclosed herein. This embodiment of the present invention can also be incorporated into a spacer having the features of other embodiments disclosed herein, such as is shown in FIGS. 8, 9 and 10.

Both of the architectures described allow the spacer to maximize the relatively greater insulative value of the polymeric portion of the spacer by allowing the polymeric portion to extend across the entire distance between the metal spacer and the glass pane. The architecture of the present invention also allows the relatively greater moisture transmission character of the polymeric portion (as compared to the filler material) to be mollified by providing a deep trough which allows the filler material to form a moisture barrier extending substantially completely, if not completely, across the glass-metal substrate distance.

Turning to 15, spacer 400 which interposed between glass panes (not shown), and which may be incorporated into a conventional IG window such as is shown in FIG. 1.

Window spacer 400 comprises a roll-formed metal substrate 403 having inner surface 403a, engagement surfaces 403b and 403c, and outer surface 403d. The portion of metal substrate 403 forming inner surface 403a has seam slit 404 which extends longitudinally the length of the metal substrate 403. Slit 404 separates the two portions 405 and 406 of that portion forming inner surface 403a. Slit 404 provides air circulation to interior space 408 which may contain a desiccant (not shown).

The terminal ends of portions 405 and 406, denoted 405a and 406a, are specifically roll-formed to be deformed inward toward interior space 408 so as to form trough 410.

Figure 15:
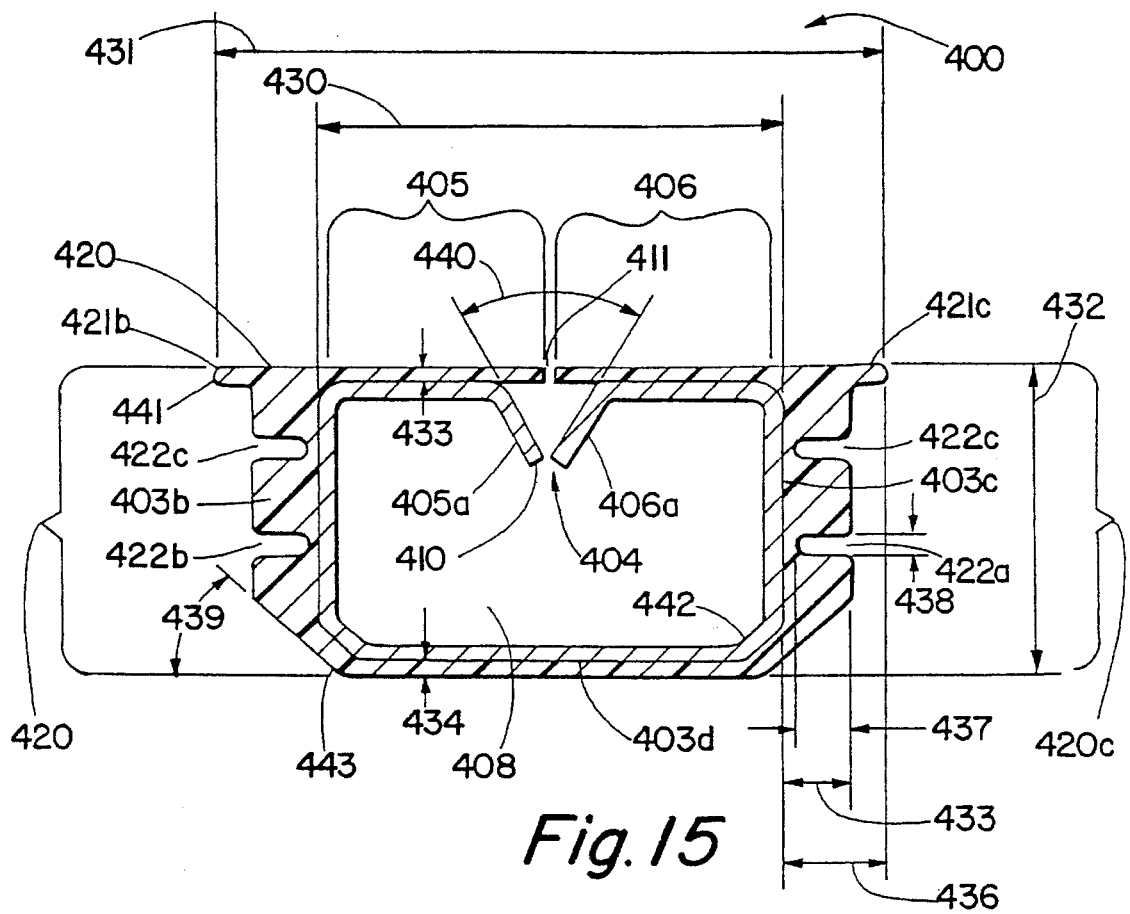
FIG. 15 is a cross-sectional view of a spacer member in accordance with another embodiment of the present invention.

Roll-formed metal substrate 403 alone in its unaltered state is flexible to torsional stress applied along its longitudinal axis. In this embodiment, slit 404 could be (but need not be) spot welded along its length to solidify it against torsional stress about its longitudinal axis, or provided with a polymer 420 to cover at least the engagement surfaces of the metal substrate and the entire inner surface (including the portion containing trough 410); and preferably on all surfaces of the metal substrate (as shown in FIG. 15; covering surface 403d is optional). Even if slit 404 is not spot welded, the polymer covering serves to solidify the resultant metal-polymer substrate. Providing this layer of polymer covers trough 410 which can further be perforated with standard perforating equipment to provide air circulation to inner space 408 and to the desiccant therein (not shown). The design of this embodiment of the present invention allows the polymer disposed over the trough to be perforated (such as by hole 411; in the same fashion as in FIG. 11) without injury or increased wear to the perforating equipment by providing clearance for the tooling to perforate to polymer without encountering the surface of the metal substrate.

FIG. 15 shows the architecture of the polymer coating portions 420b and 420c. Portions 420b and 420c show yet another alternative embodiment of the spacer architecture by being formed so that each engagement side has least one contact portion (i.e. 421b and 421c; usually in the form of extensions), which are adapted to contact the respective inner surfaces of the adjacent glass panes of the multiglazed window (not shown, but in the fashion of FIGS. 8, 10 and 12). Portion 420b also contains trough portions 422a and 422b which extend substantially to the surface 403b. Portion 420c also contains trough portions 422c and 422d which extend substantially to the surface 403c. In the same fashion as is shown in FIGS. 8, 9, 10 and 12, the space formed between the respective glass panes (not shown) and polymeric portions 420b and 420c is filled with a filler material (not shown).

The specific dimensions of the spacer 400, typical of the dimensions of a spacer in accordance with the present invention, are also shown in FIG. 15. Although spacers of the present invention may vary up to an overall width of ⅞ inch, the following is an example of a ½ inch spacer.

The cross-section of metal substrate 403 in 15 is shown as a rectangle, but may be any other appropriate geometry, such as the trapezoidal cross-sections of FIGS. 8–12.

The width 430 of the metal substrate is about 0.376±0.004 inches.

The overall width 431 and overall height 432 of the spacer are, respectively, 0.496±0.004 inches and 0.235±0.005 inches.

The thickness of the polymeric coating, although not a limitation to this embodiment of the invention in broadest terms, is generally typically in the range of from about 0.007 to about 0.030 inches. The thicknesses 433 and 434 of the polymeric layer on the inner and outer surfaces, respectively, is about 0.007 inches. The thickness 435 of the polymeric layer on the engagement sides is about 0.043 inches, with the overall thickness 436 of the polymeric layer, including the optional extension portion, is about 0.060 inches.

The depth 437 of troughs 422a, 422b, 422c and 422d is about 0.036 inches, and their width 438 is about 0.016 inches.

Angle 439 is about 45 degrees while angle 440 is about 60 degrees. Radius 441 is 0.008 (typical), and radius 442 is 0.010 (in 10 places). Radius 443 is 0.033.

Figure 16:
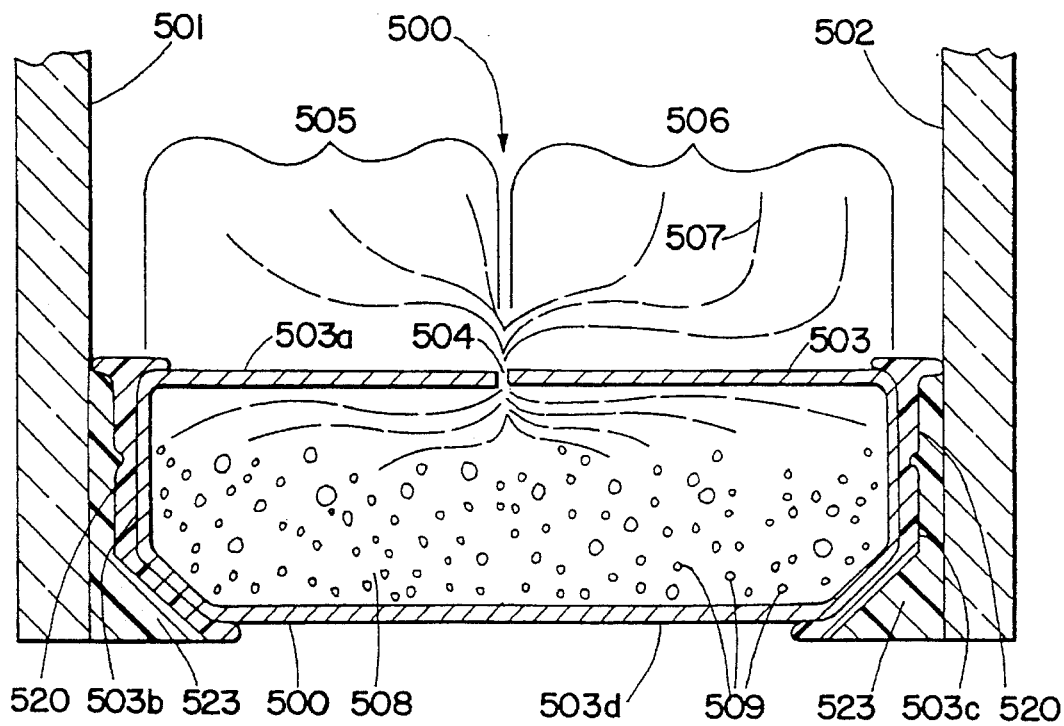
FIG. 16 is a cross-sectional view of a spacer member in accordance with alternative embodiment of that shown in FIG. 12, shown interposed between two glass panes.

FIG. 16 shows an alternative embodiment to that shown in FIGS. 12 and 15.

Window spacer 500 comprises a roll-formed metal substrate 503 having inner surface 503a, engagement surfaces 503b and 503c, and outer surface 503d. The portion of metal substrate 503 forming inner surface 503a has seam slit 504 which extends longitudinally the length of the metal substrate 503. Slit 504 separates the two portions 505 and 506 of that portion covering inner surface 503a. Slit 504 is laser welded at spots along its length such as weld 524 to solidify it against torsional stress, with spacing in the welds left to allow air flow 507 through slit 504. Spacer 500 includes the provision of a polymer 520 to the engagement surfaces of the metal substrate.

Spacer 500 is shown interposed between glass panes 501 and 502, and is incorporated into a multiglazed window using sealant 523.

The thickness of the polymeric coating, although not a limitation to this embodiment of the invention in broadest terms, is typically in the range of from about 0.007 to about 0.060 inches. Polymers used in accordance with the present invention may be chosen from any polymer appropriate for use in a window spacer, such as rigid and semi-rigid polyvinylchlorides (PVCs) and chloropolyvinylchlorides (CPVCs), such as those mentioned above. These polymers include those mentioned above.

The spacer of these embodiments can therefore be produced by roll-forming the metal substrate (without spot welding the resulting slit), and coextruding the polymer onto the metal substrate in the fashion described above.

In accordance with the present disclosure, any of the spacers summarized above and exemplified by FIGS. 8, 9, 10, 12, 15, and 16 may be provided with an additional coating of a fluoropolymer as shown in FIGS. 4 and 5. Such spacers may also be made to include other features of the present invention, such as making the spacers using fluoropolymer and/or foamed polymer, in accordance with the balance of the present disclosure.

In view of the foregoing disclosure, it will be possible for one of ordinary skill in the art to make modifications and alterations to, and variations in the present invention, including the substitution of the equivalent materials, parts and there arrangement without departing from the spirit of the present invention as reflected in the disclosure and the appended claims.

What is claimed is:

1. A spacer member for use between two glass members, said spacer member comprising a metal-polymer composite, said composite comprising:
   (a) a roll-formed metal substrate, said metal substrate having a longitudinal axis, an inner surface, two engagement surfaces and an outer surface, said surfaces substantially enclosing a space, and said inner surface of said metal substrate having an open slit extending substantially parallel to said longitudinal axis and substantially the entire length of said metal substrate; and
   (b) a polymer adhered to inner surface and said engagement surfaces of said metal substrate so as to form said metal-polymer composite; whereby said metal substrate substantially resists torsional force about said longitudinal axis.

2. A spacer member according to claim 1 wherein said metal substrate comprises a metal selected from the group consisting of aluminum, stainless steel and electrogalvanized steel.

3. A spacer member according to claim 1 wherein a portion of said polymer is disposed over said slit and wherein said portion of said polymer disposed over said slit is perforated so as to allow air into said space.

4. A spacer member according to claim 3 wherein said space is provided with a desiccant.

5. A spacer member according to claim 1 wherein said polymer is selected from the group consisting of polyvinylchlorides and chloropolyvinylchlorides.

6. A spacer member according to claim 1 wherein said polymer is adhered to said metal substrate by a heat-activated adhesive.

7. A spacer member according to claim 1 wherein said metal-polymer composite additionally comprises a layer of a fluoropolymer disposed on said polymer.

8. A spacer member for use between two glass members, said spacer member comprising a metal-polymer composite, said composite comprising:
   (a) a roll-formed metal substrate, said metal substrate having a longitudinal axis, an inner surface, two engagement surfaces and an outer surface, said surfaces substantially enclosing a space, and said inner surface of said metal substrate having a slit extending substantially parallel to said longitudinal axis and substantially the entire length of said metal substrate, said slit has been provided with a plurality of welds along said slit; and
   (b) a polymer adhered to all of said sides of said metal substrate, except that said slit is maintained substantially open so as to allow air into said space.

9. A spacer member according to claim 8 wherein said metal substrate comprises a metal selected from the group consisting of aluminum, stainless steel and electrogalvanized steel.

10. A spacer member according to claim 8 wherein said space is provided with a desiccant.

11. A spacer member according to claim 8 wherein said polymer is selected from the group consisting of polyvinylchlorides and chloropolyvinylchlorides.

12. A spacer member according to claim 8 wherein said polymer is adhered to said metal substrate by a heat-activated adhesive.

13. A spacer member according to claim 8 wherein said metal-polymer composite additionally comprises a layer of a fluoropolymer disposed on said polymer.

14. A spacer member for use between two glass members, said spacer member comprising a metal-polymer composite, said composite comprising:
   (a) a metal substrate, said metal substrate having a longitudinal axis, an inner surface, two engagement surfaces and an outer surface, said surfaces substantially enclosing a space, and said inner surface of said metal substrate comprising two opposed portions having a slit therebetween, said slit extending substantially parallel to said longitudinal axis, said opposed portions each having terminal edges, said terminal edges being bent into said space so as to form a trough in said inner surface and substantially parallel to said longitudinal axis;
   (b) a polymer attached to at least said inner side of said metal substrate so as to form said metal-polymer composite, said polymer disposed over said trough; and
   (c) at least one aperture in said polymer allowing fluid communication into said space.

15. A spacer member according to claim 14 wherein said metal substrate comprises a metal selected from the group consisting of aluminum, stainless steel and electrogalvanized steel.

16. A spacer member according to claim 14 wherein said polymer is selected from the group consisting of polyvinylchlorides and chloropolyvinylchlorides.

17. A spacer member according to claim 14 wherein said polymer is adhered to said metal substrate by a heat-activated adhesive.

18. A spacer member according to claim 14 wherein said at least one aperture comprises a series of apertures disposed in a linear series substantially parallel to said longitudinal axis.

19. A spacer member according to claim 14 wherein said metal-polymer composite additionally comprises a layer of a fluoropolymer disposed on said polymer.

20. A spacer member according to claim 14 wherein said space is provided with a desiccant.

21. A spacer member for use between two glass members, said spacer member comprising a metal-polymer composite, said composite comprising:
   (a) a metal substrate, said metal substrate having a longitudinal axis, and two engagement surfaces,
   (b) a polymer portion adhered to each of said engagement sides of said metal substrate, each said polymer portion having at least one contact portion adapted to contact one of said glass members, and at least one trough, said trough extending substantially to said respective engagement surface.

22. A spacer member according to claim 21 wherein said metal substrate comprises a metal selected from the group consisting of aluminum, stainless steel and electrogalvanized steel.

23. A spacer member according to claim 21 wherein said polymer is selected from the group consisting of polyvinylchlorides and chloropolyvinylchlorides.

24. A spacer member according to claim 21 wherein said polymer is adhered to said metal substrate by a heat-activated adhesive.

25. A spacer member according to claim 21 wherein said metal-polymer composite additionally comprises a layer of a fluoropolymer disposed on said polymer.

26. A spacer member according to claim 21 wherein each said at least one trough extends at least 50% of the distance to said respective engagement surface.

27. A spacer member according to claim 21 wherein each said at least one trough extends at least 75% of the distance to said respective engagement surface.

28. A spacer member according to claim 21 wherein each said at least one trough extends at least 95% of the distance to said respective engagement surface.

29. A spacer member according to claim 21 wherein each said at least one trough extends completely to said respective engagement surface.

30. A spacer member according to claim 21 wherein the thickness of said polymer is in the range of from about 0.007 to about 0.030 inches.

31. A spacer member according to claim 21 wherein said trough extends to a distance of between from about 0 to about 0.007 inches from said metal substrate.

32. A multi-glazed window comprising at least two adjacent glass panes, at least one adjacent pair of said glass panes having disposed therebetween a spacer member according to any of claims 1–13, 14–20, and 21–31.

* * * * *